Aug. 6, 1929.　　　D. D. GOODLIN　　　1,723,506
HAY LOADING AND STACKING MACHINE
Filed Oct. 22, 1928　　2 Sheets-Sheet 1
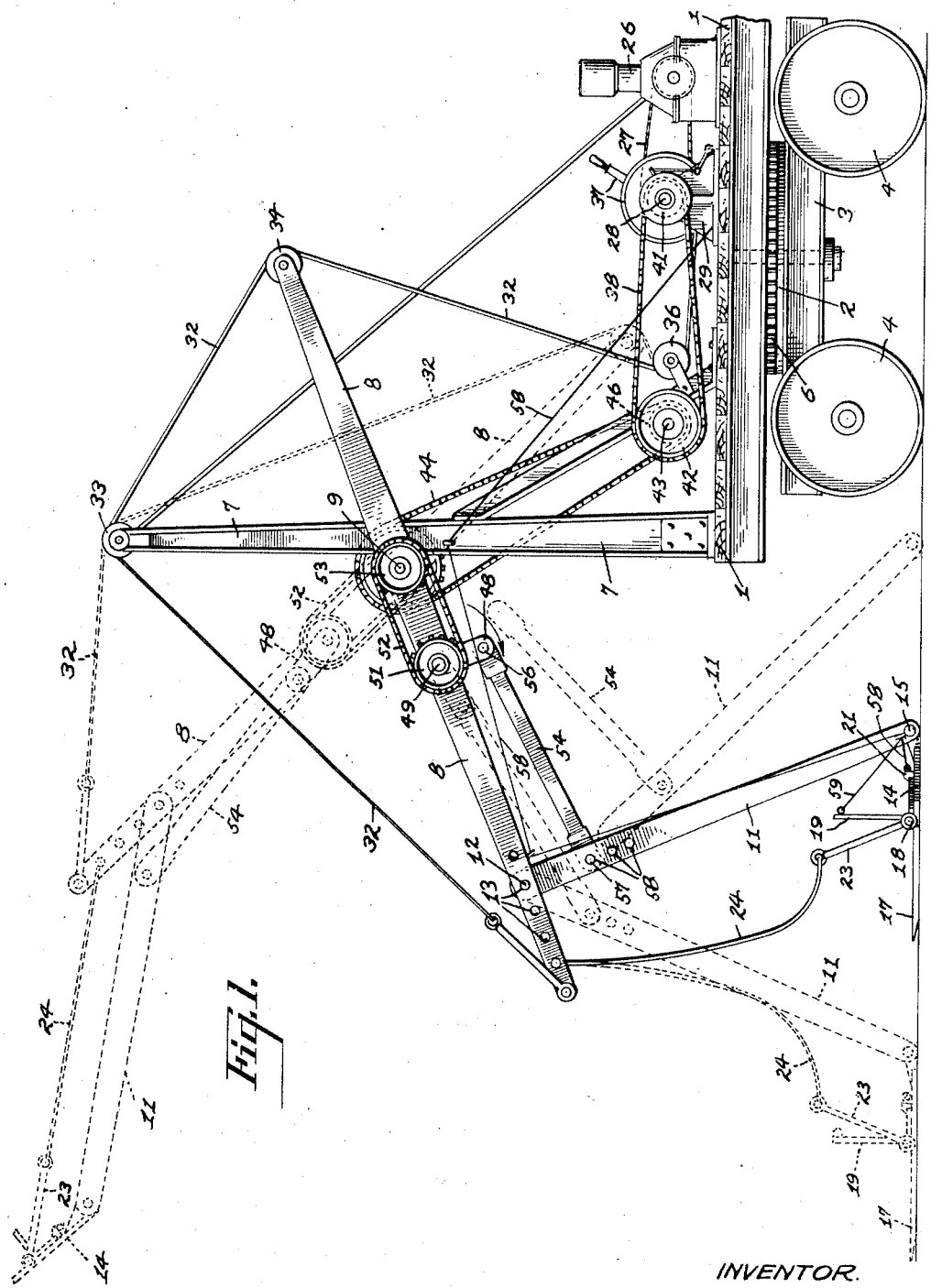
INVENTOR.
DAVID D. GOODLIN
By Arthur L. Slee
ATTY.

Aug. 6, 1929.                D. D. GOODLIN                1,723,506
                    HAY LOADING AND STACKING MACHINE
                      Filed Oct. 22, 1928     2 Sheets-Sheet 2
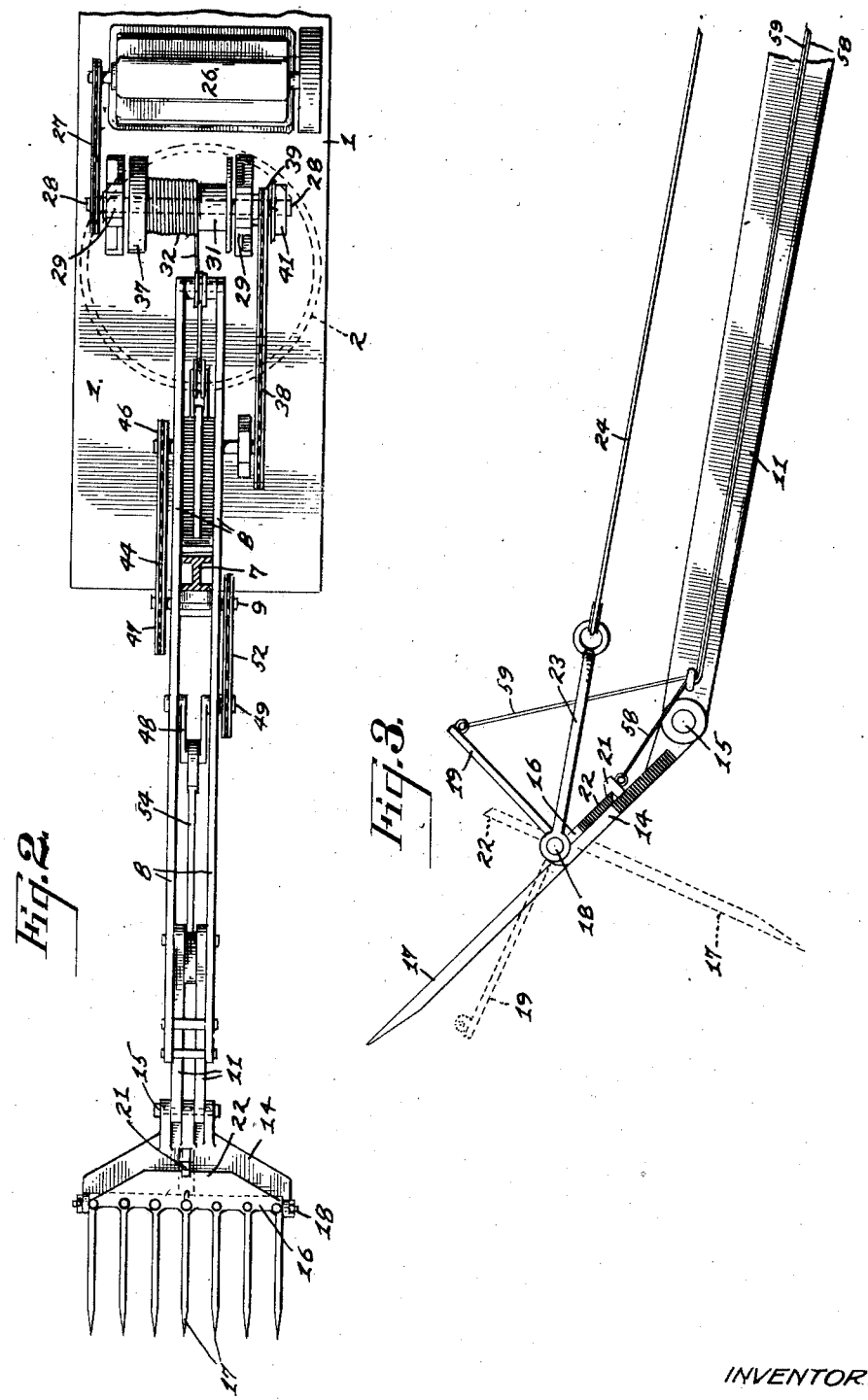
INVENTOR.
DAVID D. GOODLIN
BY *Arthur L. Slee*
ATTY.

Patented Aug. 6, 1929.

1,723,506

UNITED STATES PATENT OFFICE.

DAVID D. GOODLIN, OF SALINAS, CALIFORNIA.

HAY LOADING AND STACKING MACHINE.

Application filed October 22, 1928. Serial No. 314,241.

My invention relates to improvements in hay loading and stacking machines wherein a loading arm is pivotally mounted upon a pivotally movable boom, and provided with a hay gathering and lifting fork, said arm being movable simultaneously with or independently of the movement of said boom for gathering hay and delivering the same to a desired position upon a load or stack.

The primary object of my invention is to provide an improved machine for loading or stacking hay and the like.

Another object is to provide an improved machine which may be operated to gather hay from a relatively large area of the ground and which will operate to lift and swing the gathered hay to a desired position for release upon a load or stack.

A further object is to provide an improved machine wherein a fork is arranged to be moved flat along the surface of the ground to gather hay and the like thereon, and to be raised in a position substantially parallel to the ground to carry the gathered hay.

Another object is to provide an improved machine of the character described wherein the fork is normally moved to an operative position when lowered for movement along the ground to gather hay and having improved means for releasing the fork to drop the hay when moved to a desired position.

A further object is to provide an improved machine wherein a single power driven shaft is arranged to actuate a pivotally movable boom and to actuate a lifting arm pivotally mounted upon said boom, said arm being actuated simultaneously with the boom or independently thereof as desired.

Another object is to provide an improved machine which may be readily transported around a field for loading and which may be readily used for transferring hay from a loaded wagon to a stack.

A still further object is to provide an improved machine of the character described which may be built of relatively light construction and which may be efficiently operated by a single operator.

I accomplish these and other objects by means of the improved machine disclosed in the drawings forming a part of the present application wherein like characters of reference are used to designate similar parts throughout the specification and drawings, and in which—

Fig. 1 is a side elevation of my improved hay loading and stacking machine, the loading arm being indicated in several positions;

Fig. 2 is a plan view of the machine; and

Fig. 3 is a broken side elevation, drawn upon larger scale, of the loading fork.

Referring to the drawings, the numeral 1 is used to designate in general a platform mounted upon a turn table 2 carried by a carriage frame 3 supported upon suitable wheels 4. The platform is arranged to be turned relative to the frame 3 by means of a gear 6 mounted in connection with the turntable in the well known manner.

A mast 7 is secured upon the forward end of the platform 1, said mast preferably consisting of a T-section tapering toward the top. A boom 8 is pivotally mounted upon the mast 7, said boom preferably consisting of a pair of spaced parallel members extending upon opposite sides of the boom and supported slightly rearwardly of their centers upon a shaft 9 journaled upon the mast 7 at a point preferably slightly above the center.

A loading arm 11 is pivotally mounted upon the outer or forward end of the boom 8 by means of a pivot shaft 12 arranged to engage any of a plurality of holes 13 formed in spaced relation along the end of the boom. The arm 11 hangs downwardly from the end of the boom 8 and is provided with a hay gathering and lifting fork comprising a body portion 14 pivotally mounted as at 15 upon the free end of the arm 11 and a tine portion 16 provided with a plurality of tines 17 extending forwardly in the plane of the body portion 14. The tine portion 16 is pivotally connected as at 18 to the body portion 14, and is provided with a plurality of upwardly disposed rods 19 arranged at substantially right angles to the tines 17 adjacent their juncture with the tine base portion 16.

A latch 21 is mounted upon the body portion 14 and is arranged to normally engage an extension 22 of the tine portion 16 overlapping said body portion 14 to normally retain the tine portion and the tines 17 within the plate of said body portion. A bail 23 is pivotally connected to the pivot 18 and provided with a flexible connection 24 connected between the bail and the outer end of the boom to limit the downward swinging movement of the body portion 14 upon its pivotal connection 15 to the end of the arm 11.

The boom 8 and loading arm 11 are operated by a suitable source of power such as an internal combustion engine 26 mounted upon the platform 1 and connected by means of a suitable driving connection 27 to a shaft 28 journaled upon suitable supports 29 mounted upon said platform. A drum 31 is mounted upon the shaft 28 and arranged to receive a cable 32 connected to the boom 8 for oscillating said boom upon the mast 7, the cable preferably being extended over pulleys 33 and 34 mounted upon the top of the mast 7 and the rearward end of the boom 8 and thence around a pulley 36 arranged to guide the cable onto the drum 31. A suitable clutching means 37 is mounted in connection with the shaft 28 and drum 31 whereby said drum may be connected and disconnected as desired, and a suitable braking means is associated with said clutching means to hold the drum against rotation when the clutching means is released. As such clutching and braking means is well known in the art and forms no part of the present invention, a detailed disclosure of this mechanism is herein unnecessary and is omitted.

A chain or other suitable driving connection 38 is connected over a driving member 39 mounted upon the shaft 28 and arranged to be connected and disconnected from said shaft as desired by means of a suitable clutching means 41, braking means being also provided to hold the driving member against rotation upon the shaft when the clutching means is disconnected, as in the case of the drum 31. The driving chain 38 is mounted over a sprocket 42 mounted upon a shaft 43. A drive chain 44 is mounted over sprockets 46 and 47 mounted upon the shaft 43 and the pivot shaft 9 upon which the boom 8 pivots. A crank 48 is mounted upon the boom 8 by means of a shaft 49 provided with a sprocket 51 driven by a chain 52 mounted over said sprocket 51 and a sprocket 53 mounted upon the pivot shaft 9. The crank 48 is connected to the loading arm 11 by means of a link 54 connected to the crank by means of a pivot pin 56 and connected to the arm 11 by means of a pin 57 arranged to engage any of a plurality of apertures 58 arranged in spaced relation along the arm 11.

In operation, the engine 26 is operated to drive the shaft 28 continuously while the machine is in use. For gathering and loading hay and the like in the field, the machine is moved by any suitable tractive means. To gather hay, the arm is oscillated by moving the clutching means 41 to connect the arm driving means, the drive chains 38, 44, and 52 operating to rotate the crank 48 upon the boom 8 and thereby oscillate the arm 11 by means of the link 54.

As the arm 11 is swung rearwardly toward the carriage, the boom 8 is lowered by paying out cable from the drum 31 until the fork carried upon the end of the arm 11 is caused to rest substantially flat upon the ground. The extreme rearward position of the arm 11 and link 54 is shown in detached position in dotted lines in Fig. 1. As the crank 48 is rotated in the direction indicated by the arrow, the arm 11 is swung forwardly, the fork being moved along the ground as indicated in full lines to a position such as indicated in dotted lines at the extreme forward end of its sweep along the ground. As the fork is thus moved, the tines 17 are moved along the ground to gather hay thereon, said hay being banked against the vertical rods 19 to retain the gathered hay upon the fork.

As the arm 11 approaches its extreme forward position, the boom 8 is raised by taking in cable upon the drum 31 to elevate the arm 11 and fork to a position such as the upper dotted position indicated in Fig. 1 of the drawings. The platform 1 is then shifted upon the turn table mounting thereof to swing the boom 8 and arm 11 to a desired position extending over the wagon onto which the hay is to be loaded, and as the fork reaches the desired position, the latch 21 is released by means of a cord 58 connected to said latch and extending along the arm 11 and boom 8 to a position near the operator of the machine. When the latch is released, the tine portion 16 of the fork swings downwardly upon its pivot mounting 18, as indicated in dotted lines in Fig. 3, thereby dropping the hay at the desired point.

As the crank 48 continues to rotate, the arm 11 is swung backward toward its extreme rearward position, and at the same time the boom 8 is lowered so that the fork will be lowered onto the ground as the arm approaches said extreme rearward position. As the fork nears the ground, the depending tine portion 16 of the fork will first touch the ground and the further movement of the arm 11 and boom 8 will cause the fork to be swung back to normal position resting flat upon the ground and the latch 21 will reengage the extension 22 and hold the tine portion in normal position until again released. A cord 59 connected to a rod 19 of the fork parallels the cord 58 and is arranged to move the tine portion 16 to normal position if necessary.

By a proper timing of the operation of the boom with regard to the motion of the crank 48 and arm 11, the crank may be kept rotating continuously to cause the fork to make a relatively long sweep along the ground while the boom is lowered, and to attain the greatest extension when the boom is raised and turned to extend over the load. In like manner, the entire machine may be continuously advanced at a rate timed with respect to the operation of the loading arm so that at each sweep of the arm 11, the hay will be gathered and lifted from the portion of the field next to be traversed by the machine, thus obtaining a substantially continuous operation. The operation of either the arm or the boom may be interrupted and either member held in a desired position, independently of the operation of the other member when conditions make such interruption necessary.

For stacking hay, the machine is moved to a desired position near the stack. The arm 11 and boom 8 are then operated as above described to gather hay from a loaded wagon or the like and elevate and deliver said hay to a desired position upon the stack. For this purpose, the machine remains stationary, and the arm is lowered to gather the hay directly from the top of a load of hay drawn alongside of the machine, the operation of the machine being substantially the same except that the fork is lowered onto the loaded wagon instead of onto the ground.

The plurality of apertures 58 permits the throw of the arm 11 to be adjusted to various requirements, and the plurality of apertures 13 permits the arm 11 to be adjusted to various positions relative to the end of the boom to vary the reach and throw of the arm.

The flexible connection 24 permits the fork to readily adapt itself to the surface of the ground, and the cable 32 permits the boom to be slightly raised by the arm 11 as said arm is swung from its rearward to its forward extreme positions while the fork is resting upon the ground, thereby insuring that the fork may be moved flat along the ground to gather hay thereon without imposing undue stress upon the arm or boom, and permitting the fork to clear obstructions which may be encountered.

The cable 32 extending over the top of the mast 7 and around the rearward end of the boom 8 serves as truss to distribute the load and give rigidity to the entire structure, thereby permitting the mast and boom to be made of relatively light construction.

While I have illustrated and described only the preferred embodiment of my invention, the device is of course subject to modification in numerous details without departing from the spirit of my invention. I therefore do not wish to restrict myself to the specific details illustrated and described, but desire to avail myself of all modifications which may fall within the scope of the appended claims.

Having thus described my invention what I claim as new and desire to secure by Letters Patent is—

1. A hay loading and stacking machine comprising a rotatable platform; a mast mounted upon the platform; a boom pivotally mounted upon the mast; a loading arm pivotally mounted upon the boom; means for oscillating the boom upon the mast; a crank mounted upon the boom; a link pivotally mounted between the crank and the loading arm; means for actuating the crank and link to oscillate the arm relative to the boom; a hay gathering and lifting fork pivotally mounted upon the loading arm and arranged to be moved along the ground to gather hay and to lift said hay; means for normally holding the fork substantially parallel to the ground; and means for releasing said fork to drop the hay when raised to a desired position.

2. A hay loading and stacking machine comprising a rotatable platform; a mast mounted upon the platform; a boom pivotally mounted upon the mast; a loading arm pivotally mounted upon the boom; a power driven shaft mounted upon the platform; a winding drum mounted upon the shaft; a cable mounted upon the drum and connected to the boom and arranged to be let out and taken in for oscillating the boom upon the mast; means connected between the shaft and the loading arm for oscillating the arm relative to the boom; a hay gathering and lifting fork pivotally mounted upon the loading arm and arranged to be moved along the ground to gather hay and to lift said hay; means for normally holding the fork substantially parallel to the ground; and means for releasing said fork to drop the hay when raised to a desired position.

3. A hay loading and gathering machine comprising a rotatable platform; a mast mounted upon the platform; a boom pivotally mounted upon the mast; a loading arm pivotally mounted upon the boom; a power driven shaft mounted upon the platform; a winding drum mounted upon the shaft; a cable mounted upon the drum and connected to the boom and arranged to be let out and taken in for oscillating the boom upon the mast; actuating means connected between the shaft and the loading arm and operative in any position of the boom for oscillating the arm relative to the boom; a hay gathering and lifting fork pivotally mounted upon the loading arm and arranged to be moved along the ground to gather hay and to lift said hay; means for normally holding the fork substantially parallel to the ground; and means for releasing said fork to drop the hay when raised to a desired position.

4. A hay loading and gathering machine comprising a rotatable platform; a mast mounted upon the platform; a boom pivotally mounted upon the mast; a loading arm pivotally mounted upon the boom; a power driven shaft mounted upon the platform; a drum mounted upon the shaft and arranged to be connected and disconnected therefrom as desired; a boom actuating cable wound upon the drum and connected to the boom for raising and lowering the boom; actuating means connected between the shaft and the loading arm for oscillating the arm relative to the boom, said actuating means being arranged to be connected and disconnected as desired, independently of the operation of the boom and operative in any position of said boom; a hay gathering and lifting fork pivotally mounted upon the loading arm and arranged to be moved along the ground to gather and lift hay; means normally holding the fork substantially parallel to the ground; and means for releasing said fork to drop the hay when carried to a desired position.

5. A hay loading and gathering machine comprising a rotatable platform; a mast mounted upon the platform; a boom pivotally mounted upon the mast; a loading arm pivotally mounted upon the boom; a power driven shaft mounted upon the platform; a drum mounted upon the shaft and arranged to be connected and disconnected therefrom as desired; a boom actuating cable wound upon the drum and connected to the boom for raising and lowering the same; a crank rotatably mounted upon the boom; a link connected between the crank and the arm; actuating means connected between the shaft and the crank for rotating said crank to oscillate the arm, said actuating means being operable in any position of the boom and independently of the movement thereof; a hay gathering and lifting fork pivotally mounted upon the loading arm and arranged to be moved along the ground to gather and lift hay; means normally holding the fork in substantially parallel relation to the ground; and means for releasing said fork to drop the hay when carried to a desired position.

6. A hay loading and gathering machine comprising a rotatable platform; a mast mounted upon the platform; a boom pivotally mounted in an elevated position upon said mast; a loading arm pivotally mounted upon the boom; a power driven shaft mounted upon the platform; a drum mounted upon said shaft; a boom actuating cable wound upon the drum and connected over the top of the mast to the boom and arranged to be taken in and paid out from the drum to raise and lower the boom; a crank mounted upon the boom; a link connecting the crank to the loading arm; crank actuating means connected to the shaft independently of the drum for rotating said crank to oscillate the loading arm; a hay gathering and lifting fork pivotally mounted upon the loading arm and arranged to be moved along the ground to gather and lift hay; means normally holding the fork in substantially parallel relation to the ground; and means for releasing said fork to drop the hay when carried to a desired position.

7. A hay loading and gathering machine comprising a rotatable platform; a mast mounted upon the platform; a boom pivotally mounted upon the mast; a loading arm pivotally mounted upon the boom; a power driven shaft mounted upon the platform; a drum mounted upon the shaft; a boom actuating cable wound upon the drum and connected to the boom for raising and lowering the same; a crank mounted upon the boom; a link connected between the crank and the boom; crank actuating means connected to the shaft independently of the drum for rotating the crank to oscillate the loading arm; a hay gathering and lifting fork pivotally mounted upon the loading arm and arranged to be moved along the ground to gather and lift hay; a latch mounted in connection with the fork for normally holding the tines thereof substantially parallel to the ground; and means connected to the latch and extending along the arm and boom to the platform for moving the latch to release the tines to drop hay carried thereon at a desired point.

8. In a hay loading and stacking machine, the combination with a mast and boom, of a loading arm pivotally mounted upon the boom; a crank rotatably mounted upon the boom; a link connected between the crank and the loading arm; and means for rotating the crank to oscillate the arm.

9. In a hay loading and stacking machine, the combination with a mast and boom, of a loading arm; means for mounting said arm in adjustable pivoted relation to the boom; a crank rotatably mounted upon the boom; a link adjustably connected between the crank and the loading arm; and means for rotating the crank to oscillate the arm.

10. In a hay loading and stacking machine, the combination with a mast and boom, of a loading arm pivotally mounted upon the boom; a crank rotatably mounted upon the boom; a link connected between the crank and the loading arm; and driving connections mounted in connection with the crank and operable to any position of the boom and independently of the motion of said boom for oscillating the loading arm.

11. In a hay loading and stacking machine, the combination with a mast and boom, of a loading arm pivotally mounted upon the boom; a crank rotatably mounted upon the boom; a link connected between the crank and the loading arm; driving connections mounted in connection with the crank and operable at any position of the boom and independently of the motion of said boom for oscillating the loading arm; and a hay gathering fork pivotally mounted upon the end of the loading arm and movable thereby to gather and lift hay.

In witness whereof, I hereunto set my signature.

DAVID D. GOODLIN.